Patented May 29, 1951

2,554,997

UNITED STATES PATENT OFFICE 2,554,997

22-ACYLOXY-22-MONOARYL-BISNOR-4-CHOLENE-3-ONES

Robert H. Levin, A. Vern McIntosh, Jr., and George B. Spero, Kalamazoo, Mich., assignors to The Upjohn Company, Kalamazoo, Mich., a corporation of Michigan No Drawing. Application April 25, 1949, Serial No. 89,568

3 Claims. (Cl. 260—397.4)

This invention relates to 22-acyloxy-22-aryl-bisnor-4-cholene-3-ones, valuable intermediates in the synthesis of progesterone. Progesterone is a well known hormone of valuable utility.

The compounds of the present invention have the following formula:

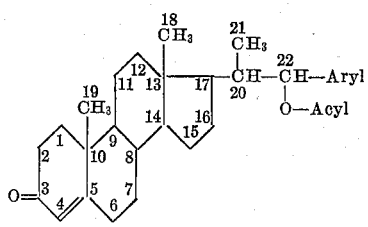

The aryl group substituted on the 22-carbon atom is not critical in nature, however, practical considerations concerning the preparation of the 22-aryl compound, limit the aryl groups to those compounds whose halogen substitution derivatives react in a satisfactory manner with magnesium to form an aryl magnesium halide compound. Representative aryl groups which may be substituted on the 22-carbon atom are, for example, phenyl, tolyl, alpha-naphthyl, beta-naphthyl, alkoxy-phenyl, alkoxy-naphthyl, and alkyl-naphthyl, et cetera. The acyloxy group substituted on the 22-carbon atom may be any suitable acyloxy group. Among those which might be mentioned are, for example, acetoxy, propionoxy, butyroxy, cyclohexoyloxy, palmitoxyloxy, myristoyloxy, caproyloxy, stearoyloxy, decanoyloxy, heptanoyloxy, benzoyloxy, naphthoyloxy, et cetera.

Compounds of the present invention may be conveniently prepared by oxidizing the hydroxyl group of a 22-acyloxy-22-aryl-bisnor-5-cholene-3-ol, using the Oppenhauer oxidation. The compound thus obtained may be conveniently transformed into progesterone by the hydrolysis of the acyloxy group, dehydration of the hydroxyl group thus obtained and subsequent mild oxidation to yield progesterone.

The compounds of the present invention are white crystalline solids, soluble in hot alcohol but relatively insoluble in cold alcohol.

The following examples are given to illustrate a procedure which may be used to prepare the compounds of the present invention, but the said procedure is not to be construed as limiting.

PREPARATION 1.—22-BENZOYLOXY-22-PHENYL-BISNOR-5-CHOLENE-3-OL

A solution of 701.6 milligrams of 3,22-dibenzoyloxy-22-phenyl-bisnor-5-cholene [Heyl, Centolella and Herr, J. Am. Chem. Soc. 69, 1960 (1947)] in 420 milliliters of acetone was mixed with 56 milliliters of 0.10-normal aqueous potassium hydroxide and allowed to stand forty-five hours at 33–34 degrees centigrade. The solution was then acidified by the addition of two milliliters of acetic acid and evaporated in vacuo until precipitation began. One volume of water was added and the mixture was cooled. There was thus obtained 597 milligrams of a solid melting at 114–125 degrees centigrade. The solid was dissolved in 25 milliliters of hot benzene, and allowed to stand at room temperature, thereby precipitating 46.6 milligrams of 22-phenyl-bisnor-5-cholene-3,22-diol, melting at 222–227 degrees centigrade. The filtrate was passed through a column containing 50.5 grams of Fisher alumina. A first fraction of 71 milligrams was eluted with benzene and consisted of unchanged 3,22 - dibenzoyloxy - 22 - phenyl - bisnor - 5-cholene. The second fraction was eluted with benzene containing two percent methanol, dissolved in 25 milliliters of warm benzene and placed in the refrigerator at 6–8 degrees centigrade to yield a precipitate of 16.0 milligrams of 22-phenyl-bisnor-5-cholene-3,22-diol having a melting point of 221–224 degrees centigrade.

PREPARATION 2.—22-ACETOXY-22-PHENYL-BISNOR-5-CHOLENE-3-OL

In a manner similar to that of Preparation 1, 3,22 - diacetoxy - 22 - phenyl - bisnor - 5 -cholene [J. Am. Chem. Soc. 69, 1960 (1947)] was partially saponified to give 22-acetoxy-22-phenyl-bisnor-5-cholene-3-ol.

*Example 1.—22-benzoyloxy-22-phenyl-bisnor-4-cholene-3-one*

A solution of 479 milligrams of crude 22-benzoyloxy-22-phenyl-bisnor-5-cholene-3-ol in 20 milliliters of toluene and ten milliliters of cyclohexanone was distilled until one milliliter of distillate had been collected. Five-tenths gram of aluminum isopropoxide was then added and the mixture heated under reflux for three hours. The reaction mixture was shaken with ether and 3-normal hydrochloric acid, and the ether solution was washed with 3-normal hydrochloric acid, water, ten percent aqueous sodium hydroxide, 3-normal hydrochloric acid, and saturated aqueous sodium chloride. The solution was distilled with steam for an hour, giving 421 milligrams of a precipitate melting at 85–90 degrees centigrade. The precipitate was chromatographed over Fisher alumina, giving a main fraction of 419 milligrams which was crystallized from ethanol and water to give 332.3 milligrams of crystals melting at 158–164 degrees centigrade. After several crystallizations from alcohol-water, and two crystallizations from ethanol, the compound melted at 181.5–182.5 degrees centigrade; $[\alpha]_D^{25}$ −11.6 degrees.

Analyis:

Calculated for $C_{35}H_{42}O_3$: C, 82.31  H, 8.29
Found: 82.18  8.13

*Example 2.—22-acetoxy-22-phenyl-bisnor-4-cholene-3-one*

When oxidized as in Example 1, 22-acetoxy-22-phenyl-bisnor-5-cholene-3-ol gave 22-acetoxy-22-phenyl-bisnor-4-cholene-3-one, melting at 196–198 degrees centigrade; $[\alpha]_D^{24}$ of +68.5.

Analysis:

Calculated for $C_{30}H_{40}O_3$: C, 80.31  H, 9.01
Found: 80.47  8.96

In a similar manner the 22-tolyl-22-acetoxy, 22-(beta-naphthyl)-22-propionyloxy, 22-(alkylphenyl)-22-butyryloxy, et cetera, substituted -bisnor-4-cholene-3-one compounds may be prepared.

It is to be understood that the invention is not limited to the exact details or compounds shown and described, as obvious modifications and substitutions of equivalents may be made in the present invention without departing from the spirit or scope thereof, which will be apparent to one skilled in the art, and we therefore limit ourselves only as defined in the appended claims.

We claim:

1. A 22 - acyloxy - 22 - mono - phenyl - bisnor-4-cholene-3-one, wherein the acyloxy group is the residue of an unsubstituted organic monocarboxylic acid containing from 1 to 7 carbon atoms, inclusive.

2. 22 - benzoyloxy - 22 - phenyl - bisnor - 4-cholene-3-one.

3. 22 - acetoxy - 22 - phenyl - bisnor - 4-cholene-3-one.

ROBERT H. LEVIN.
A. VERN McINTOSH, JR.
GEORGE B. SPERO.

REFERENCES CITED

The following references are of record in the file of this patent:

UNITED STATES PATENTS

| Number | Name | Date |
|---|---|---|
| 2,394,551 | Julian et al. | Feb. 12, 1946 |